May 30, 1961 R. H. KITTLEMAN ET AL 2,986,109
ROLL CONTROL SYSTEM
Filed July 23, 1954

INVENTORS
ROBERT H. KITTLEMAN
RONALD G. WARREN
BY G. D. O'Brien
ATTORNEY

2,986,109
ROLL CONTROL SYSTEM

Robert H. Kittleman and Ronald G. Warren, Sharon, Pa., assignors, by mesne assignments, to the United States of America as represented by the Secretary of the Navy Filed July 23, 1954, Ser. No. 445,494

8 Claims. (Cl. 114—24)

This invention relates to roll control systems for guided missiles, and in particular to an improved roll control system for a torpedo.

In a torpedo, it is desirable that rotation or angular displacement of the torpedo about its roll axis be minimized even though the torpedo is maneuvering both in azimuth and in elevation. Modern azimuth and depth control systems for torpedoes normally include means for measuring the angular velocity of the torpedo with respect to the pitch and yaw axes of the torpedo. The angular velocities of the torpedo about its pitch and yaw axes, or the measured pitch rate and the measured course rate, respectively, are useful in providing stabilized depth and azimuth control for the torpedo. The measured course rate and measured pitch rate are the same as the true course rate and the true pitch rate of the torpedo only when the pitch and yaw axes of the torpedo are respectively horizontal and vertical, or when the torpedo has a zero roll angle. Thus, one reason for controlling the roll angle is to provide more accurate control of the course rate and pitch rate. The effect of a roll angle other than zero on depth steering, for instance, is that the measured pitch rate will include a component of the true course rate. The component of course rate in the measured pitch rate is equal to the true course rate times the sine of the roll angle. Depending upon the direction of the roll, the torpedo will either climb or dive until a depth error is created which will satisfy the course rate component of the measured pitch rate. This will, of course, cause the torpedo to operate with incorrect depth control. Similarly, when the roll angle is other than zero, the measured course rate of the torpedo will include a component of the true pitch rate and cause the torpedo to steer an incorrect course in azimuth.

Some stable roll control systems require means for measuring the roll position, or roll angle, and means for measuring the rate of change of the roll angle, or roll rate. The roll angle can be measured by a vertical gyro, and the roll rate can be measured by a rate gyro. However, the use of a vertical gyro has drawbacks in that vertical gyros are expensive, occupy considerable space, need an erection system, and are subject to drift.

The roll control system constituting this invention is intended for use in a torpedo, as stated above, where space, weight and other limitations make the use of a vertical gyro undesirable. In the system here described, roll angle is measured by means of pendulum which is also subject to centrifugal force whenever the torpedo is turning about the yaw axis. It is therefore necessary, in order to compensate for the effects of centrifugal force on the pendulum, to measure the course rate of the torpedo about its yaw axis, which can be accomplished by a rate gyro. Previous torpedo roll control systems which have used a pendulum have required two rate gyros, one measuring the roll rate and the other the course rate. Such a roll control system is simpler than a system using a vertical gyro. The roll control system constituting this invention uses a pendulum and a single rate gyro which is mounted to measure components of both the course rate of the torpedo with respect to its yaw axis and the roll rate with respect to its roll axis, as will be subsequently described. As a result, the space and weight of the roll control system are further minimized since only a single rate gyro is required.

It is, therefore, an object of this invention to provide an improved roll control system for a torpedo.

It is a further object of this invention to provide an improved roll control system for a torpedo, in which the number of components, their weight and their volume are minimized.

It is a still further object of this invention to provide a roll control system, for a vehicle, which uses a pendulum to measure roll angle and a single rate gyro to measure components of the course rate and the roll rate about the yaw and roll axes of the vehicle.

Other objects and many of the attendant advantages of this invention will be readily appreciated as the same become better understood by reference to the following detailed description when considered in connection with the accompanying drawings, wherein.

Figure 1:
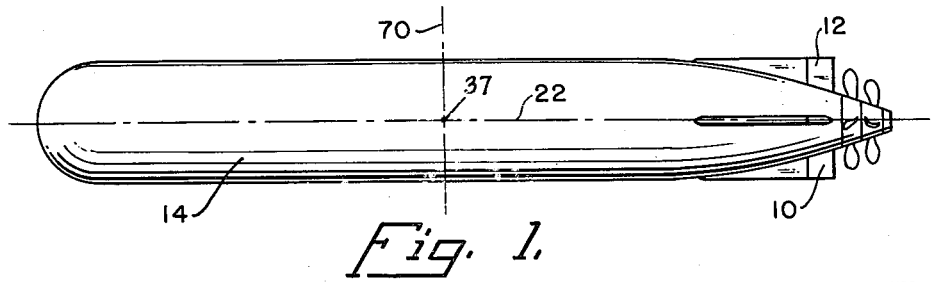
Fig. 1 is a top plan of a torpedo.
Figure 2:
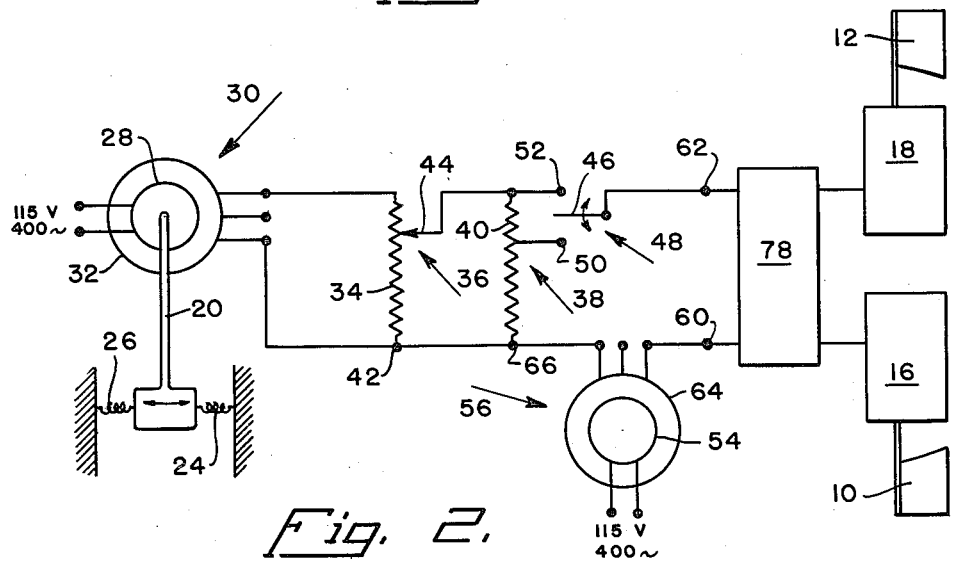
Fig. 2 is a schematic view of the roll control system for a torpedo.

In Fig. 1 port and starboard elevators, 10, 12 of torpedo 14 are seen. Elevators 10 and 12 are positioned by means of conventional port and starboard actuators 16, 18 which are seen in Fig. 2. Actuators 16 and 18 are adapted to turn elevators 10 and 12 differentially to control the roll angle of torpedo 14.

The roll angle, or roll position, of the torpedo is measured by pendulum 20 which is mounted by conventional means, which are not illustrated, within torpedo 14 so that its axis of rotation is parallel to roll axis 22 of torpedo 14. Pendulum 20 is restrained by calibrated springs 24, 26 so that when the torpedo rolls in one direction, or the other, pendulum 20 will compress one of the springs 24, 26 and stretch the other. As a result, pendulum 20 moves through a smaller angle than the roll angle of the torpedo which, of course, reduces the space required for the pendulum. The rotor 28 of a conventional synchro generator 30 is turned by the pendulum 20. Rotor 28 is energized by 115 volt, 400 cycle A.C., in a preferred example. The voltages induced in the windings of the stator 32 of synchro generator 30 are a function of the position of rotor 28 with respect to stator 32. The voltage across one phase of stator 32 is connected across resistor 34 of the roll position sensitivity potentiometer 36. The amplitude of the voltage applied across resistor 34 is a function of the magnitude of the roll angle and the centrifugal force imposed by the speed and course rate of the torpedo, and the phase of this voltage is a function of the sense or direction of the roll angle.

Whenever the course rate of torpedo 14 about its yaw axis 37 is other than zero, the centrifugal force, C.F., acting on pendulum 20 is defined by the equation $$\text{C.F.} = \frac{MV^2}{R} \tag{1}$$

where M is the mass of pendulum 20, V is the velocity of torpedo 14 and R is the length of the radius of curvature of the path traveled by torpedo 14.

However, $$V = Rw \tag{2}$$

where $w$ is the angular velocity, or, in this case, the measured course rate of torpedo 14.

By combining Equations 1 and 2 with elimination of R, it is seen that $$C.F. = MVw \quad (3)$$

Torpedo 14 may be designed to operate, by conventional means which are not illustrated, at two different speeds, a high speed and a low speed. Since centrifugal force is directly proportional to torpedo speed V, as well as to course rate $w$, it is then necessary to provide means to take this into account. Voltage dividing network 38 is the means for doing this, and comprises resistor 40 across which the potential between terminal 42 and movable tap 44 of potentiometer 36 is applied. The movable element 46 of selector switch 48 is connected to intermediate terminal 50 of network 38 when the torpedo is traveling at its high speed, and to terminal 52 when the torpedo is traveling at its low speed. This is accomplished by conventional means, such as a solenoid, which is not illustrated, whenever the speed of the torpedo is changed.

Figures 3, 4:
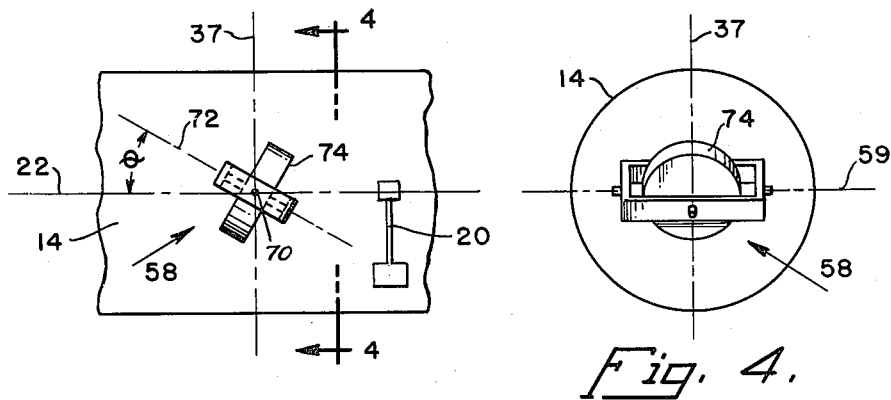
Fig. 3 is a schematic longitudinal section, partially broken away, to show the orientation of the rate gyro, and pendulum.
Fig. 4 is a section taken on line 4—4 of Fig. 3.

Rotor 54 of conventional synchro generator 56 is operatively connected to, and turned by, rate gyro 58. The restraint means and the gyro pick off are not illustrated in Figs. 3 and 4, and the mechanical connection between the gimbal axis 59 of rate gyro 58 and rotor 54 of synchro generator 56 is not shown in Fig. 2. Rotor 54 is energized by 115 volt, 400 cycle A.C. from, preferably, the same source which energizes rotor 28, so that the voltages energizing rotors 28 and 54 will be in phase. The voltage between terminals 60 and 62, the error voltage of the roll control system, is the sum of the voltages across one phase of stator 64 of synchro generator 56 and the voltage between terminal 66 of resistor 40 and movable element 46 of selector switch 48.

Rate gyro 58 is mounted in torpedo 14 so that its gimbal axis 59 is substantially parallel to the pitch axis 70 of torpedo 14, and the axis of rotation 72 of the rotor 74 of gyro 58 lies in a plane parallel to the plane determined by the roll axis 22 and the yaw axis 37 of torpedo 14. As a result, the sensitive axis of rate gyro 58, the axis at right angles to the gimbal axis 59 and the rotor axis 72, is oriented so as to measure components of roll rate and course rate of torpedo 14 about axes 22 and 37.

From Equation 3 it can be seen that the centrifugal force acting on pendulum 22 is also directly proportional to $w$, the measured course rate of the torpedo. It is clear that centrifugal force acting alone can displace pendulum 20 and produce a voltage across resistor 34. The voltage due to centrifugal force acting on pendulum 20 must be compensated, if the roll angle is to be maintained substantially equal to zero at all times. The voltage induced in stator 64 of synchro generator 56 is a function of the measured course rate $w$.

The mounting angle $\theta$ of gyro 58, determined by axis of rotation 72 and roll axis 22, and the position of movable tap 44 of sensitivity potentiometer 36, can be adjusted so that the voltage produced by the synchro generator 56, due to the course rate of torpedo 14 about yaw axis 37, cancels that component of the voltage between terminal 66 and movable element 46 due to centrifugal force acting on pendulum 20 for a given value of V, the speed of the torpedo. Angle $\theta$ is also selected so that the ratio of roll position signal sensitivity to roll rate signal sensitivity is as desired.

From these considerations it can be shown that:

$$\theta = \cot^{-1} \frac{K_1}{K_2} \frac{V}{g} \quad (4)$$

where:

$K_1$ = roll position sensitivity in $\dfrac{\text{elevator differential (deg.)}}{\text{roll angle (deg.)}}$ $K_2$ = roll rate sensitivity in $\dfrac{\text{elevator differential (deg.)}}{\text{roll rate (deg./sec.)}}$ $V$ = torpedo speed in feet/second
$g$ = acceleration of gravity in feet/second$^2$ Since centrifugal force is also directly proportional to torpedo speed V, as pointed out above, the centrifugal force acting on pendulum 20 when the torpedo is traveling at high speed is greater than at low speed for a given value of $w$, the course rate. To avoid resetting both the angle $\theta$ and sensitivity potentiometer 36, voltage dividing network 38 is included in the roll control system. At high speed, when the centrifugal force acting on pendulum 20 is greater than at low speed, by the ratio of the magnitude of the high speed to the magnitude of the low speed, the A.C. voltage from synchro generator 30 between terminal 66 and movable element 46 is reduced by the inverse ratio of the high speed to the low speed by having movable element 46 engage terminal 50. The A.C. voltage from synchro generator 56, due to the course rate about axis 37 of torpedo 14, just cancels the course rate component of voltage between terminal 66 and movable element 46 so that no component voltage due to centrifugal force acting on pendulum 20 exists between terminals 60, 62. The ratio of the resistance between terminal 50 and terminal 66, and between terminal 52 and terminal 66, is the same as the ratio of the low speed to the high speed of torpedo 14.

At low speed, the centrifugal force acting on pendulum 20 is less, for a given course rate about axis 37, than at high speed, so movable element 46 is placed in engagement with terminal 52. The output voltage from the sensitivity potentiometer 36 due to centrifugal force is then just balanced out by the voltage from synchro 56 due to the course rate about yaw axis 37. While the change in position of movable element 46 with change in speed causes the ratio of roll position signal sensitivity to roll rate signal sensitivity to change, tests show that this does not adversely affect the roll control system.

When pendulum 20 is deflected from parallelism to yaw axis 37, synchro generator 30 will produce a voltage whose magnitude is a function of the magnitude of the deflection and whose phase is a function of the sense or direction of the deflection. Synchro generator 56 will produce a voltage whose magnitude is a function of the magnitude of the roll rate and whose phase is a function of the sense or direction of the roll rate. The voltage of synchro generator 56 is added with a portion of the voltage from synchro generator 30 determined by the setting of sensitivity potentiometer 36 and the position of movable element 46. The combined voltages are the roll error voltage. The roll error voltage is amplified by conventional servo amplifier 78, and the output of amplifier 78 controls the port and starboard actuators 16, 18 to position rudders 10, 12 to maintain the roll angle of torpedo 14 substantially zero.

For convenience, gyro 58 has been illustrated as being mounted at the intersection of the pitch, yaw and roll axes of torpedo 14. This is not intended as a limitation. It is only necessary that the sensitive axis of rate gyro 58 lie in a plane parallel to the plane determined by the intersection of the roll axis 22 and yaw axis 37. Also, the axis of rotation of pendulum 20 need not coincide with roll axis 22, it need only be parallel to it.

Obviously many modifications and variations of the present invention are possible in the light of the above teachings. It is, therefore, to be understood that within the scope of the appended claims, the invention may be practiced otherwise than as specifically described.

What is claimed is:

1. A roll control system for a torpedo having at least a yaw axis and a roll axis, comprising a pendulum mounted in said torpedo to measure the roll angle of said torpedo with respect to the roll axis, first electrical means operatively connected to said pendulum for producing an A.C. voltage whose phase and amplitude are functions of the magnitude and direction of said roll angle, a rate gyro mounted in said torpedo to measure components of the angular velocity of said torpedo about said roll and yawl axes, second electrical means operatively connected to said rate gyro for producing a second A.C. voltage whose amplitude and phase are functions of the sum of the components of the angular velocities of said torpedo measured by said rate gyro, circuit means for adding said first and second voltages, and means responsive to said voltages for substantially preventing roll of the torpedo, said rate gyro being mounted so that the A.C. voltage produced by said second electrical means substantially nullifies the component of the A.C. voltage produced by said first electrical means due solely to the displacement of said pendulum by the action of centrifugal force acting on said pendulum.

2. A roll control system for a torpedo, comprising a pendulum mounted to measure the roll angle of the torpedo, a synchro generator operatively mounted to said pendulum for producing a first electrical signal which is a function of the roll angle measured by said pendulum, a rate gyro having its sensitive axis lying in a plane substantially parallel to the plane determined by the roll axis and yaw axis of said torpedo but not parallel to either of said axes, a second synchro generator operatively connected to said rate gyro for producing a second electrical signal which is a function of the roll rate and course rate of said torpedo about its roll axis and yaw axis, means for combining said first and second signals, and means responsive to said combined signals for maintaining the roll angle of the torpedo substantially zero, the system being so arranged that the portion of the second electrical signal due to the course rate of the torpedo substantially cancels the portion of the first electrical signal due to the action of centrifugal force on said pendulum.

3. In a torpedo having a roll axis, a yaw axis, a pitch axis, propulsion means for driving said torpedo at a high speed and a low speed, and elevators, a pendulum having an axis of rotation, said pendulum being mounted so that its axis of rotation is substantially parallel to the roll axis, electrical means operatively connected to said pendulum for producing a first voltage which is a function of the roll angle of the torpedo, a rate gyroscope having a gimbal axis, and a rotor axis, means mounting said gyroscope in said torpedo so that said gimbal axis is substantially parallel to the pitch axis of the torpedo, said rotor axis of said gyroscope lying in a plane substantially parallel to the plane determined by the yaw and roll axes of said torpedo and at a predetermined angle with respect to said roll axis, second electrical means operatively conected to said gyroscope for producing a second voltage which is a function of the angular velocities measured by said rate gyroscope, circuit means, to which said first voltage is applied, for producing a third voltage which is additionally a function of the speed of said torpedo, means for adding said second and third voltages in series, and means responsive to said added voltages to position said elevators to eliminate roll of said torpedo about its roll axis, said predetermined angle being selected so that the portion of the second voltage due to the angular velocity of the torpedo about its yaw axis substantially cancels the portion of the third voltage due to the action of centrifugal force on said pendulum.

4. In a torpedo having a roll axis and a yaw axis, propulsion means adapted to drive said torpedo at a high speed and a low speed, and elevators, a pendulum having an axis of rotation, said pendulum being mounted so that its axis of rotation is substantially parallel to the roll axis, a first synchro generator operatively connected to said pendulum for producing a first A.C. voltage whose amplitude and phase are a function of the roll angle of the torpedo, a rate gyroscope, means mounting said gyroscope so that said gyroscope can measure components of the angular velocity of said torpedo about its yaw axis and roll axis, a second synchro generator operatively connected to said gyroscope for producing a second A.C. voltage whose amplitude and phase are functions of the components of angular velocities measured by said rate gyroscope, a sensitivity potentiometer across which the first A.C. voltage is applied, and which produces a third A.C. voltage, a voltage dividing network across which said third voltage is applied, said voltage divider network adapted to produce a fourth A.C. voltage whose amplitude is additionally a function of the speed of the torpedo, circuit means for adding said second and fourth voltages to produce a fifth voltage, a servo amplifier to which said fifth voltage is applied, actuators operatively connected to the elevators of the torpedo to which the output of said servo amplifier is applied to position said elevators to maintain the roll angle of the torpedo substantially equal to zero, said gyroscope being mounted so that the portion of the second A.C. voltage due to the angular velocity of the torpedo about its yaw axis substantially cancels the portion of the fourth voltage due to the action of centrifugal force on said pendulum.

5. In a torpedo as defined in claim 4 in which the voltage divider comprises a resistor across which said third voltage is applied, a pair of terminals, a movable element mounted to engage one or the other of said terminals, and means for causing said element to engage one of said terminals when said torpedo is driven at high speed and said other terminal when said torpedo is driven at said low speed.

6. In a mobile craft adapted to change course rate about a yaw axis and further adapted to change speed, said mobile craft thereby normally subject to roll displacements about a roll axis, the combination comprising a rate gyro and associated means arranged to provide a first voltage as a function of both the course and roll rates of said mobile craft, gravity-responsive means arranged to provide a second voltage as a function of angular displacement, from true vertical, of the plane defined by said roll and yaw axes, said second voltage including an error component due to centrifugal acceleration imposed by course rate and speed, means for modifying said second voltage inversely as said speed, means for combining said first and modified second voltages to provide a roll control voltage in which said error component is cancelled, and means for utilizing said roll control voltage to substantially eliminate angular displacement of the mobile craft about said roll axis, said first voltage also serving as a control voltage for use in maitaining a predetermined course rate.

7. In a mobile craft adapted to change course rate about a yaw axis and further adapted to change speed, said mobile craft thereby normally subject to roll displacements about a roll axis, the combination comprising a rate gyro and associated means arranged to provide a first voltage as a function of both the course and roll rates of said mobile craft, gravity-responsive means arranged to provide a second voltage as a function of angular displacement, from true vertical, of the plane defined by said roll and yaw axes, said second voltage including an error component due to centrifugal acceleration imposed by course rate and speed, means for modifying said second voltage inversely as said speed, means for combining said first and modified second voltages to provide a roll control voltage in which said error component is cancelled, and means for utilizing said roll control voltage to substantially eliminate angular displacement of the mobile craft about said roll axis.

8. In a mobile craft adapted to change course rate about a yaw axes, said mobile craft thereby normally subject to roll displacements about a roll axis, the combination comprising a rate gyro and associated means arranged to provide a first voltage as a function of the course rate of said mobile craft, gravity-responsive means arranged to provide a second voltage as a function of angular displacement, from true vertical, of the plane defined by said roll and yaw axes, said second voltage including an error componet due to centrifugal acceleration imposed by course rate, means for combining said first and second voltages to provide a roll control voltage in which said component due to course rate is cancelled, and means for utilizing said roll control voltage to substantially eliminate angular displacement of the mobile craft about said roll axis.

References Cited in the file of this patent

UNITED STATES PATENTS

| | | |
|---|---|---|
| 2,137,974 | Fischel | Nov. 22, 1938 |
| 2,366,543 | Meredith | Jan. 2, 1945 |

FOREIGN PATENTS

| | | |
|---|---|---|
| 679,586 | Great Britain | Jan. 2, 1945 |